Oct. 5, 1965     M. A. MOSKOVITZ     3,209,445
COMBINATION TOOL FOR DRIVING OUT AN OLD BUSHING AND
DRIVING IN A NEW ONE
Filed Jan. 19, 1962
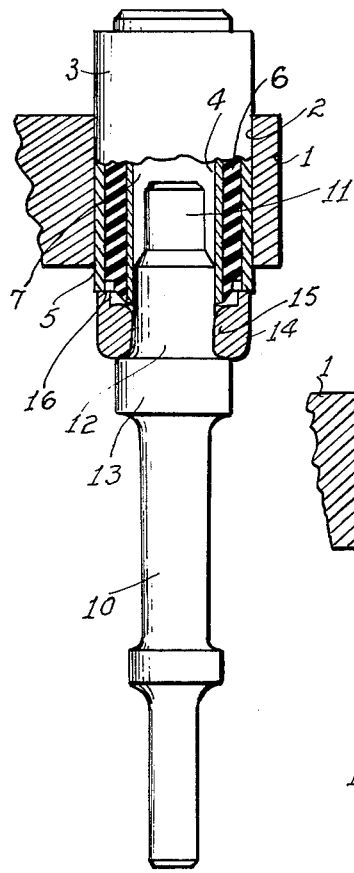
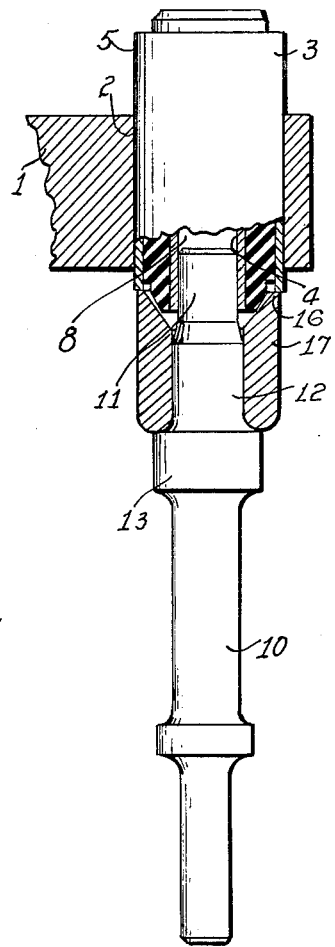
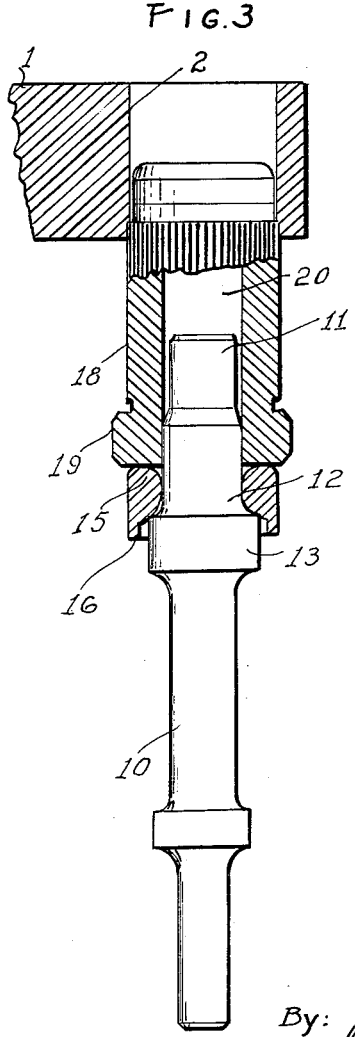
INVENTOR
MILTON A. MOSKOVITZ
By: Ben V. Zillman
ATTORNEY

United States Patent Office 3,209,445
Patented Oct. 5, 1965

3,209,445
COMBINATION TOOL FOR DRIVING OUT AN OLD BUSHING AND DRIVING IN A NEW ONE
Milton A. Moskovitz, 7 Chapel Hill, St. Louis 23, Mo.
Filed Jan. 19, 1962, Ser. No. 168,314
1 Claim. (Cl. 29—275)

This invention relates to a unitary tool that may be used for both the removal of an old bushing from its frictionally affixed installation within the eye of a machine element and the insertion of a replacement bushing thereinto.

The principal objects of my invention are to provide such a tool for driving out the frictionally held old bushing from the eye of a support member and thereafter driving the new one into said eye with a similar friction fit, the two operations being easily and readily accomplished through any suitable source of impacting power, to make such a tool of a minimum number of parts, extremely strong and sturdy in service, and which will readily adapt itself to handling bushings of several sizes of diametral bore.

A further object of the invention is to construct a tool of the kind described, composed of an elongated shank element with an annulus removably and reversibly mounted thereon and of a maximum diameter smaller than said eye, whereby when said annulus is in one position and the shank element is actuated against a bushing, the latter may be driven through said eye, and when said annulus is reversed end for end and a replacement bushing is mounted on said shank element, axial thrust on said shank element will advance said replacement bushing into place within said eye.

Many other objects and advantages of the construction herein shown and described, and the uses mentioned, will be obvious to those skilled in the art to which this invention appertains, all as will be more clearly pointed out in the following disclosure and claims thereto appended.

In the drawings, wherein like reference characters represent like or corresponding parts throughout the views, FIGURE 1 is a longitudinal cross-sectional view, partly in elevation, showing the bushing about to be removed from a retaining member;

FIGURE 2 is a similar view of a modified bushing and using a slightly modified form of tool; and FIGURE 3 is a longitudinal cross-sectional view, partly in elevation, showing the replacement bushing about to be pressed into place.

Referring more particularly to the drawings, wherein I have illustrated the preferred embodiments of my invention, 1 indicates a fragment of an arm or other linkage member formed as a constituent part of a motor vehicle, and the same having an eye 2 therethrough. A bushing member 3 is held in said eye, generally with a very tight drive-fit relationship that is customary in the automotive industry for such installations.

Bushings of the metal-bonded-to-rubber type are now quite commonly used by the industry, such bushings comprising elongated metal inner and outer concentric shells 4 and 5, respectively, as shown with a rubber or rubber-like separator 6 therebetween to absorb the radial thrust between said shells, in service.

This bushing has its outer diameter slightly greater than that through said eye, so as to have required considerable force to drive-fit it through said eye and hold it fixedly in place in the latter. The main differences between the bushings shown in FIGURES 1 and 2 are that the bore 7 entirely through said bushing shown in FIGURE 1 is of larger diameter than the bore 8 through the bushing shown in FIGURE 2.

As shown in FIGURE 1, the ends of the inner shell 4 generally extends a slight distance axially beyond the corresponding ends of the outer shell, somewhat as indicated, and this relationship is also true in the form of bushing indicated in FIGURE 2.

Remembering that the original bushings are very tightly pressed into place in the arm, and that there is often a lack of proper accessibility to working on said parts while the latter is in situ, it is sometimes necessary to completely remove such arm or other linkage member from the motor vehicle in order to place the same within a vise and thereafter work by hand to remove the bushing. Such procedure is of course, costly, and it is the prime purpose of my invention to accomplish such removal and subsequent re-insertion, without removal of the arm or a corresponding member.

The tool about to be described is extremely simple in form and construction, and consists principally of a main element 10, having one end shaped to be received within a socket or the like of any suitable source of power, such as a pneumatic hammer or the like (not shown), and whereby a series of blows or impacts may be transmitted axially through the tool, each impact being relatively light.

This novel tool is unique in its purpose and design, and in its objects, advantages and uses.

The opposite end of said tool is provided with one or more axially adjoining cylindrical pilot portions or sections 11 and 12, respectively, the foremost one 11 being of smaller diameter than the follower one. Hence, said forward pilot section may enter and be centered within the bore 8, while the follower pilot section may similarly cooperate within the bore 7 of the other size bushing.

The replacement bushing, may be of exactly the same size and shape as the one that is to be removed, if desired, but I have found it more satisfactory to have the replacement bushing of a different construction, as will be more clearly hereinafter described, and as shown in FIGURE 3.

Immediately adjoining the follower pilot section and at the rear of the latter, the shank element of the tool is radially enlarged to form a peripheral flange or shoulder 13.

A ring, collar or annulus 14, as shown in FIGURE 1, is bored end-to-end therethrough, to smoothly detachably slidably fit on said larger pilot section of the tool and abut at its one end against said flange or shoulder 13, and it is to be noted that this bore varies in its diameter so that at the second end of the annulus the bore is of increased diameter so as to provide a radially thickened wall 15, while at its second end only a rim portion 16 remains. The maximum overall diameter of said annulus is slightly less than that of the external diameter of the bushing that is to be driven out, and is of course also less than the diameter of the eye through which the bushing is to be driven, and in practice such difference is in the nature of about .010″.

This radial reduction in maximum diameter of the rim portion of the annulus insures that the same will pass easily through the eye, and yet maintain its metal-to-metal contact with the end of the bushing while engagingly driving the latter forwardly through said eye. It is to be noted that the smallest diameter of the bore through the annulus is such as to be slidably received on the larger pilot section of the shank element, as previously mentioned, and is of such length that when one end of said annulus abuts against said flange and the other end abuts against the bushing, that pilot section that slidably fits into the bushing will center the tool during operation of the latter, and to this purpose and to insure such relationship, the length of the annulus shown in FIGURE 2 is somewhat greater than that shown in FIGURE 1 thus spacing the flange 13 of the shank element farther from the adjacent end of the bushing than in the first instance. The annulus 17 shown in FIGURE 2 is therefore shown as longer than the one shown in FIGURE 1, and its bore is of a slightly different configuration, although in both instances the diameter of the bore therethrough is decreased at one end as compared with its size at the other end; however, in both instances, the metal-to-metal contact with the bushing, during operation of the tool, is maintained. Thus, one basic driver or shank element can be made to serve a plurality of sizes of bushings simply with very slight variations in the size and shape of the demountably received annuli elements.

After the old bushing has been driven out, a new one may be inserted in its place, and such a replacement bushing is indicated in FIGURE 3, the same having a main body portion 18 that is of sufficiently larger external diameter than said eye, to permit of a good and tight drive fit into the latter, the rear end of said bushing having a radially enlarged flange 19, and the bore 20 through said bushing preferably being such as to slidably receive the larger pilot section 12 of the driving tool.

When driving in the new bushing, it is best to get as large a bearing contact as possible between the annulus and the end of the bushing being impacted, and for that reason said annulus is reversed, end-for-end, as indicated in FIGURE 3, so that the thicker end of the annulus engages the bushing while the other end overhangs the flange of said shank element, thus permitting sufficient bearing engagement between the tool and annulus to satisfactorily transmit the forces therebetween.

Although the foregoing description has been directed to the removal and replacement of bushings within an arm or say other linkage parts in automotive constructions, it is to be understood that such a tool and manner of bushing treatment will find ready acceptance and usage in other fields of mechanical construction.

I claim:

A tool for knocking out a bored bushing held within an eye, said tool comprising an elongated shank element having its rear end operably engageable to forcibly advance said bushing longitudinally, the forward end of said element having at least two longitudinally adjoining pilot portions mutually differing in diameter and a third portion adjacent the larger of said pilot portions and of larger diameter than the latter, and a bored annulus detachably mounted on said forward end of said shank element, one end of said annulus terminating in an annular counterbored portion that forms a rim portion thereat that may be axially movable into said eye, and the other end of said annulus adapted to abut said third-mentioned portion of said shank element to transmit forces therebetween that are applied longitudinally on said element so as to advance said annulus, the length of said annulus being such that only one of said pilot portions may be arranged in peripheral piloting engagement within the bore of the bushing being removed while said rim portion only is adapted to remain in knock-out engagement with an end of said bushing.

References Cited by the Examiner

UNITED STATES PATENTS

| 1,483,670 | 2/24 | McKee et al. | 29—275 |
| 1,501,815 | 7/24 | Seppmann | 29—275 |
| 1,863,956 | 6/32 | Wilson | 29—275 |

WILLIAM FELDMAN, *Primary Examiner.*

NEWIN BERGER, *Examiner.*